United States Patent Office 3,234,278
Patented Feb. 8, 1966

3,234,278
PROCESS FOR THE PREPARATION OF N,N'-DIARYL-TRIHALOMETHANEDIAMINES
David H. Clemens, Willow Grove, Pa., assignor to Rohm & Haas Company, Philadelphia, Pa., a corporation of Delaware
No Drawing. Filed Oct. 19, 1961, Ser. No. 146,338
6 Claims. (Cl. 260—570.5)

This application is a continuation-in-part of application Serial No. 145,736, filed October 17, 1961, now U.S. Patent No. 3,143,571.

This invention relates to trihalomethylaminomethanes. More specifically, it relates to N,N'-diaryl-N,N'-dialkyl-diaminotrihalomethylmethane. The compounds of the invention may be represented by the formula

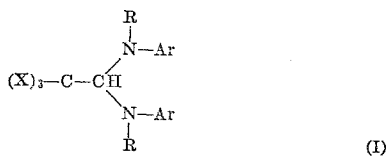

(I)

in which Ar represents an aromatic hydrocarbon group, such as an aryl group which may be optionally substituted with inert substituents, like an aryl substituent of 6 to 10 carbon atoms, X is a halogen atom having an atomic number of 9 to 25, inclusive, such as bromine, fluorine, or chlorine, and R represents an aliphatic hydrocarbon group, such as an alkyl or an alkaryl group. Typical groups which Ar may represent are the following: phenyl, naphthyl, and the like. When the aryl group is substituted with inert substituents, these may be one or more of the following: alkyl, such as methyl, isopropyl, t-octyl; halo substituents, such as fluoro, bromo; nitro substituents; alkoxy substituents, such as methoxy, ethoxy, and the like. Typical groups which R may represent are alkyl groups, including cycloalkyl groups, such as methyl, ethyl, isopropyl, 2-ethylhexyl, cyclohexyl, n-octyl, and the like.

Typical compounds of the invention are the following:

N,N'-diphenyl-N,N'-dimethyldiaminotrichloromethyl-methane,
N,N'-dinaphthyl-N,N'-dimethyldiaminotrichloromethyl-methane,
N,N'-diphenyl-N,N'-diethyldiaminotrichloromethyl-methane,
N,N'-diphenyl-N,N'-dibutyldiaminotrichloromethyl-methane,
N,N'-diphenyl-N,N'-dimethyldiaminotribromomethyl-methane,
N,N'-di-p-nitrophenyl-N,N'-dimethyldiaminotrichloro-methylmethane,
N,N'-di-p-diphenyl-N,N'-di-butyldiaminotrichloromethyl-methane, and
N,N'-diphenyl-N,N'-dihexyldiaminotrichloromethyl-methane.

The method for making the N,N'-diaryl-N,N'-dialkyl-diaminotrihalomethylmethane of the invention comprises reacting a formamidinium salt of the formula

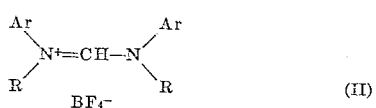

(II)

with an alkali metal trihaloacetate of the formula

(III)

In Formula II, the substituents Ar and R have the definition given above. The anion $BF_4$ may be replaced by another anion, such as iodine, bromine, chlorine, and the like. In Formula III, X is a halogen atom having an atomic number in the range of 9 to 35, such as bromine, chlorine, or fluorine, and M is an alkali metal of an atomic number of 3 to 55, inclusive, preferably lithium, sodium, or potassium. Instead of using an alkali metal, there may also be employed an alkaline earth metal, such as calcium or copper. The reactants of choice are N,N'-diphenyl - N,N' - dimethylformamidinium fluoborate and sodium trichloroacetate.

Typical useful formamidinium salts are the following:
N,N'-diphenyl-N,N'-dimethylformamidinium fluoborate,
N,N'-diphenyl-N,N'-diethylformamidinium fluoborate,
N,N'-diphenyl-N,N'-dipropylformamidinium fluoborate,
N,N'-diphenyl-N,N'-di-t-butylformamidinium fluoborate,
N,N'-di-p-nitrophenyl-N,N'-dimethylformamidinium fluoborate,
N,N'-dinaphthyl-N,N'-dimethylformamidinium fluoborate,
N,N'-di-2,3-xylidyl-N,N'-dimethylformamidinium fluoborate, and
N,N'-di-p-tolydyl-N,N'-dimethylformamidinium fluoborate.

Typical useful alkali metal trihaloacetates include: sodium trichloroacetate, sodium tribromoacetate, sodium trifluoracetate, lithium trichloroacetate, and potassium trichloroacetate.

The reaction between the formamidinium salt and the alkali metal trihaloacetate proceeds very readily; it is an exothermic reaction which may be carried out in the temperature range of about 10° to 200° C. and short of the decomposition temperature of the product. Preferably, the reaction temperature ranges between 20° and 80° C. In the reaction between the compounds of Formulas II and III, it is preferred to employ one mole of each reactant to insure completeness of the reaction. If desired, an excess of compound (II), as 50 to 100 mole percent, may be used. The process for this invention is preferably carried out in the presence of an inert solvent. For this purpose, a hydrocarbon solvent, such as benzene, toluene, xylene, a tertiary amine, such as tributylamine, a chlorinated hydrocarbon, such as ethylene dichloride may be employed; the solvents of choice are ethers such as 1,2-dimethoxyethane, diethylene glycol, dimethyl ether, tetraethylene glycol dimethyl ether, dibutyl ether, tetrahydrofuran, dioxane, dimethylether, and the like.

The product, when insoluble in the reaction mixture, may be separated by filtration and it may be further purified by washing with water and suitable solvents, such as acetone. If the product is more soluble in the reaction mixture, it may be isolated by adding a water-immiscible solvent, followed by extraction by water, removal of the solvent, as by distillation under reduced pressure, and by crystallization.

The N,N' - diaryl - N,N'-dialkyldiaminotrihalomethyl-methane compounds of the invention are useful as the active ingredient of pesticidal compositions, particularly as fungicides and herbicides.

The compounds of the invention are useful as postemergence herbicides. When applied at the rate of 10 lbs./acre, N,N'-diphenyl-N,N'-dimethyldiaminotrichloromethylmethane gives a kill of about 40% of monocotyledonous weeds in pre-emergence tests. On dicotyledons, in post-emergence tests, N,N'-diphenyl-N,N'-dimethyldiaminotrichloromethylmethane is toxic to mustard, wild carrot, mallow, pigweed, and flax.

In agricultural applications, the compounds of the invention can be prepared in the form of dusts or powders, one or more of the N,N'-diaryl-N,N'-dialkyldiaminotrihalomethylmethanes being taken up in a finely-divided solid carrier, such as talc, clay, bentonite, pyrophyllite, chalk, diatomaceous earth, or the like. Concentrations from 1% to 20% may be so used. Solvent solutions may also be prepared. Solutions in water-miscible solvents such as acetone or dioxane can be made and used by adding them to water and spraying the resulting mixture. The N,N′-diaryl-N,N′-dialkyldiaminotrihalomethylmethanes may also be taken up in such a solvent as kerosene, xylene, or methylated naphthalenes. To these solutions, emulsifying agents can be added to provide self-emulsifying concentrates for preparation of aqueous sprays.

The following examples are provided to further illustrate the invention. They are not to be construed as a limitation thereon. It will be apparent to one skilled in the art that the manipulative steps will generally be substantially identical when equivalent portions of reactants and their equivalents are substituted. All parts are by weight unless indicated to the contrary.

*Example 1(a)*

A mixture of 21 parts of N,N′-diphenyl-N,N′-dimethylformamidinium fluoborate, 12.5 parts of sodium trichloroacetate, and 100 parts of 1,2-dimethoxyethane is stirred together for 24 hours. The reaction mixture is filtered and the filtrate evaporated to dryness under reduced pressure. The material which remains is extracted with warm benzene and the benzene solution is evaporated to dryness to give 17.5 parts of N,N′-diphenyl-N,N′-dimethyldiaminotrichloromethylmethane.

*Example 1(b)*

Part (a) is repeated substituting the sodium trichloroacetate by an equivalent portion of potassium trichloroacetate. The same product is obtained.

*Example 1(c)*

Part (a) is repeated substituting the sodium trichloroacetate by an equivalent portion of sodium tribromoacetate. The product which is obtained is N,N′-diphenyl-N,N′-dimethyldiaminotribromomethylmethane.

*Example 2*

Following the procedure of Example 1(a), 26.5 parts of N,N′-diphenyl-N,N′-dibutylformamidinium fluoborate are reacted with 12.5 parts of sodium trichloroacetate in 150 parts of 1,2-dimethoxyethane by stirring the mixture for 24 hours. The reaction mixture is then filtered and from the filtrate there is obtained N,N′-diphenyl-N,N′-dibutyldiaminotrichloromethylmethane.

I claim:
1. A process for the preparation of the compounds of the formula

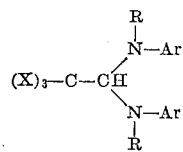

which comprises reacting a compound of the formula

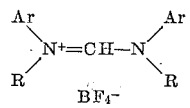

with an alkali metal trihaloacetate of the formula

in which X is a halogen atom having an atomic number of 9 to 35, R is a lower alkyl group, Ar is an aryl substituent of 6 to 10 carbon atoms, M is an alkali metal having an atomic number of 3 to 55, said reaction being carried out in the temperature range of about 10° to 200° C. and short of the decomposition temperature of the product.

2. The process of claim 1 in which the temperature is maintained in the range of 10° to 200° C.

3. The process of claim 1 in which the process is carried out in the presence of an inert solvent.

4. The process of claim 1 in which the alkali metal trihaloacetate is sodium trichloroacetate.

5. The process of claim 1 in which the temperature is maintained in the range of 20° to 80° C.

6. A process for the preparation of N,N′-diphenyl-N,N′-dimethyldiaminotrichloromethylmethane, which comprises reacting N,N′-diphenyl-N,N′-dimethylformamidinium fluoborate with sodium trichloroacetate.

References Cited by the Examiner

Beaver et al.: "Jour. Amer. Chem. Soc.," vol. 79, pages 1236–45 (1957).

Busvine: "Chemical Abstracts," vol. 41, page 2199 (1947).

Grammaticakis: "Chemical Abstracts," vol. 44, page 6272 (1950).

Summerford et al.: "Jour. Org. Chem.," vol. 9, pp. 81–4 (1944).

CHARLES B. PARKER, *Primary Examiner.*
LEON ZITVER, *Examiner.*